United States Patent
Marsch

[11] Patent Number: 5,799,691
[45] Date of Patent: Sep. 1, 1998

[54] DEVICE FOR FEEDING A GASEOUS FLUID THROUGH A BED OF BULK MATERIAL

[75] Inventor: Hans-Dieter Marsch, Dortmund, Germany

[73] Assignee: Uhde GmbH, Dortmund, Germany

[21] Appl. No.: 724,807

[22] Filed: Oct. 2, 1996

[30] Foreign Application Priority Data

Oct. 31, 1995 [DE] Germany ............... 195 40 537.4

[51] Int. Cl.$^6$ ............................................. E03B 7/07
[52] U.S. Cl. ................... 137/587 A; 137/810; 251/126; 422/181
[58] Field of Search ............... 137/807, 810, 137/561 A; 422/130, 180, 181, 176, 183; 423/360; 251/126

[56] References Cited

U.S. PATENT DOCUMENTS

| | | | |
|---|---|---|---|
| 1,539,435 | 5/1925 | Schutz | 251/126 |
| 1,771,815 | 7/1930 | Padjen | 251/126 |
| 3,123,285 | 3/1964 | Lee | 137/807 |
| 3,548,853 | 12/1970 | McEuen | 137/807 |
| 3,563,260 | 2/1971 | Ellis | 137/810 |
| 3,719,457 | 3/1973 | Nagamatsu | 422/181 |

FOREIGN PATENT DOCUMENTS

| | | | |
|---|---|---|---|
| 2128162 | 12/1972 | Germany | 137/561 |
| 1588883 | 8/1990 | U.S.S.R. | 422/181 |

*Primary Examiner*—Denise L. Ferensic
*Assistant Examiner*—John Ball
*Attorney, Agent, or Firm*—Anderson, Kill & Olick, P.C.

[57] ABSTRACT

A device for feeding a gaseous fluid radially from a center of a vessel outwards, including a central vertical gas feed tube having at least one vertical row of discharge openings, a catalyst bed of bulk material accommodated in a perforated basket, which includes a perforated cylindrical surface surrounding the central vertical gas feed tube in a spaced relationship thereto and defines with the guide feed tube a hollow cylindrical space, the perforated cylindrical surface defining an impingement surface of the catalyst bed, and deflector elements provided at the at least one row of the discharge openings to insure a substantially tangential flow of gas into the hollow cylindrical space.

9 Claims, 3 Drawing Sheets

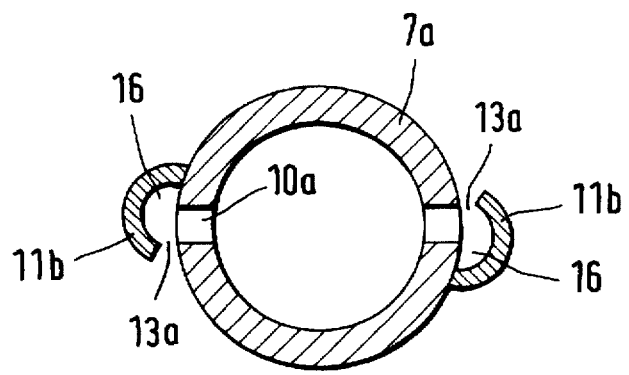
FIG.4
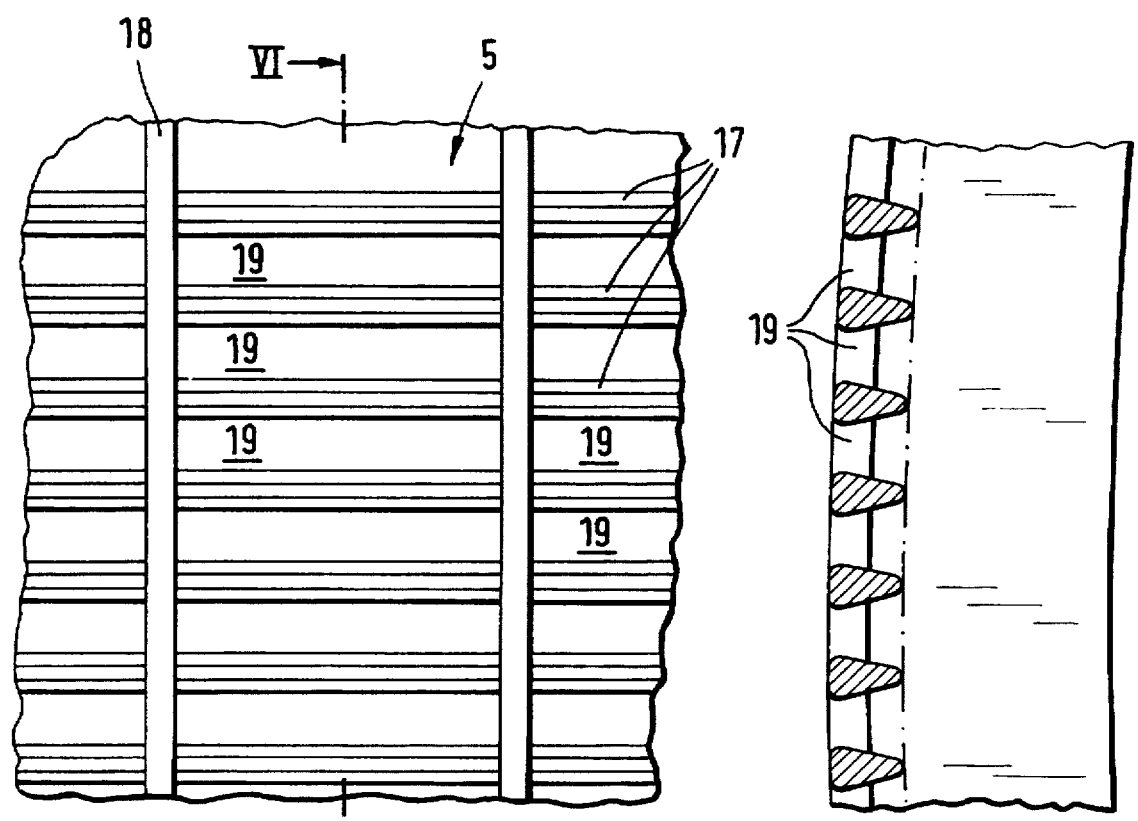
FIG.5
FIG.6

DEVICE FOR FEEDING A GASEOUS FLUID THROUGH A BED OF BULK MATERIAL

BACKGROUND OF THE INVENTION

The invention relates to a device for feeding a gaseous fluid radially through a bed of bulk material from the center outwards, the bed being in the form of a hollow cylinder, with the impingement surface of the bed being accommodated in a catalyst basket of perforated plate-type or bar-type construction.

Such hollow-cylinder-type catalyst beds are known features. As an example, reference is made to EP-B-0158 130 of the applicant, in which an embodiment provides for a gas to flow radially through a hollow-cylinder-type catalyst bed. Unfortunately, the design in the reference EP does not ensure a uniformly intensive or steady gas flow through the catalyst bed along its entire depth. However, this known design does permit the influent and effluent gas to flow in the same direction, this being achieved by a U-shaped flow pattern. This requires the cross-sectional area of the cylindrical space used as the outlet for the reaction gas to be equal to or larger than the cross-sectional area of the cylindrical space used for the influent gas flowing in axial direction.

However, this measure alone is not sufficient, since the axial velocity of the influent gas flow rate must not be too high. In the example quoted it is only 4.83 m/sec. Such low rates have the disadvantage that larger cross-sectional areas are required.

EP-A-0 446 592 features contoured walls with a small number of openings for the purpose of achieving a pressure drop that will ensure that the same pressure prevails downstream of the openings prior to the gas entering the catalyst bed. The catalyst bed is enclosed by a second gas-permeable wall, at least parts of which are in direct contact with the former wall structure.

One disadvantage of these known solutions is the fact that the gas leaves the openings at a high flow rate, at which at least part of it impinges on the gas-permeable wall structure enclosing the catalyst and also on isolated sections of the catalyst itself In the areas where the wall structures are in direct contact, the gas cannot enter the catalyst, so that an even distribution of the gas can only be achieved, if at all, at a certain depth of the catalyst bed.

DD-A-301 973 describes, generically, a reactor filled with pourable particulate catalyst, through which the gas can alternatively flow from the inside outwards. A displacer-type flow-guiding device is provided inside the catalyst basket, the purpose of which is to equalise the flow conditions over the entire depth of the catalyst bed, this flow being otherwise undefined. No provision is made there for any direct influence on the impingement of gas on the catalyst basket, the main emphasis being on the gas flowing through the catalyst bed from the outside inwards, the displacer thus being in the downstream zone.

The aim of the invention is to provide a solution for achieving a uniform distribution of the gas flowing radially though a hollow-cylinder-type catalyst bed from the center outwards.

SUMMARY OF THE INVENTION

The device with the features described above provides the solution in that the vertical gas feed tube has at least one vertical row of openings, through which the gas flows, and which is arranged at a certain distance from the perforated cylindrical impingement surface of the bed, configured in that a hollow cylindrical space is formed between the gas feed tube and said impingement surface and that, basically, guiding elements designed as deflectors diverting the flow of the gas leaving the discharge openings are provided at or above the row of openings, so as to achieve a basically tangential gas flow into the cylindrical space.

This type of flow pattern ensures that, with an axial influent gas flow, the gas will flow tangentially into the cylindrical space not containing any bulk material, resulting in a circulation of the gas prior to its entering the bulk material bed. In this way, a uniform pressure over the entire bed surface can be achieved which, in turn, results in a completely uniform flow of the influent gas into the bulk material bed. The invention also permits comparatively high velocities of the gas entering the cylindrical space, without exceeding the specified maximum velocity of the gas when flowing radially through the bed of bulk material.

Preferred embodiments of the invention are described below.

Depending on the intended application, it may be of advantage to design the deflectors basically in the form of a semi-circle, in order to create a pressure equalisation chamber directly downstream of the row of openings for the influent gas.

As an alternative, or in combination with the above, the openings in the feed tube wall may be arranged at an angle of incidence to the respective radius, so that the inclination of the discharge openings will always ensure a certain tangential discharge flow. Here, too, further deflectors may be provided with or without a pressure equalisation chamber.

A practical solution is to provide a number of rows of openings in the gas feed tube, particularly with two opposite rows of discharge openings. In order to obtain as large an impingement area as possible for the gas flowing into the bulk-material bed, the bed may be accommodated in a catalyst basket (which in itself is a known feature) or, alternatively, perforated plates or tubes with a plurality of openings may be provided for the purpose.

A further embodiment of the invention provides for the cylindrical space to have a volume that permits a multiple of the gas quantity admitted per unit of time to circulate in the cylindrical space per unit of time.

This results in a particularly uniform flow within the cylindrical space, so that the gas will impinge on the bed of bulk material at an extremely even rate.

The applicant herein has found out that a particular uniform flow can be achieved with a device with a tangential slot-type discharge opening into the cylindrical space, with the dimensions of said space and the slot or slots being determined according to the following formula:

$$\Gamma = \frac{\dot{V}_0}{l} \sqrt{\frac{r_a(r_0 + h_1)}{n \cdot h \cdot [r_a - (r_0 + h_1)]}} \quad [m^2/s]$$

where $\dot{V}_0$ [m³/s] is the effective volume of the incoming fluid h [m] is the height of the slot $h_t$ [m] is the height of the slot+design dimension, e.g. thickness of the plate covering the slot l [m] is the slot length n [–] is the number of slots $r_a$ [m] is the outer radius of the cylindrical space $r_0$ [m] is the outer radius of the gas feed tube and where Γ is equal at least 0.1 m²/s and at most 10 m²/s, but preferably is selected in a range between 0.5 and 6 m²/s.

The attached drawing provides more detailed information on the invention by way of examples.

BRIEF DESCRIPTION OF THE DRAWINGS

FIG. 4 shows a modified detail drawing of a central gas feed tube;

FIG. 5 shows a plan view of an impingement surface section of the bed accommodated in a catalyst basket;

FIG. 6 shows a section along line VI—VI in FIG. 5.

DETAILED DESCRIPTION OF THE PREFERRED EMBODIMENTS

Figure 1:
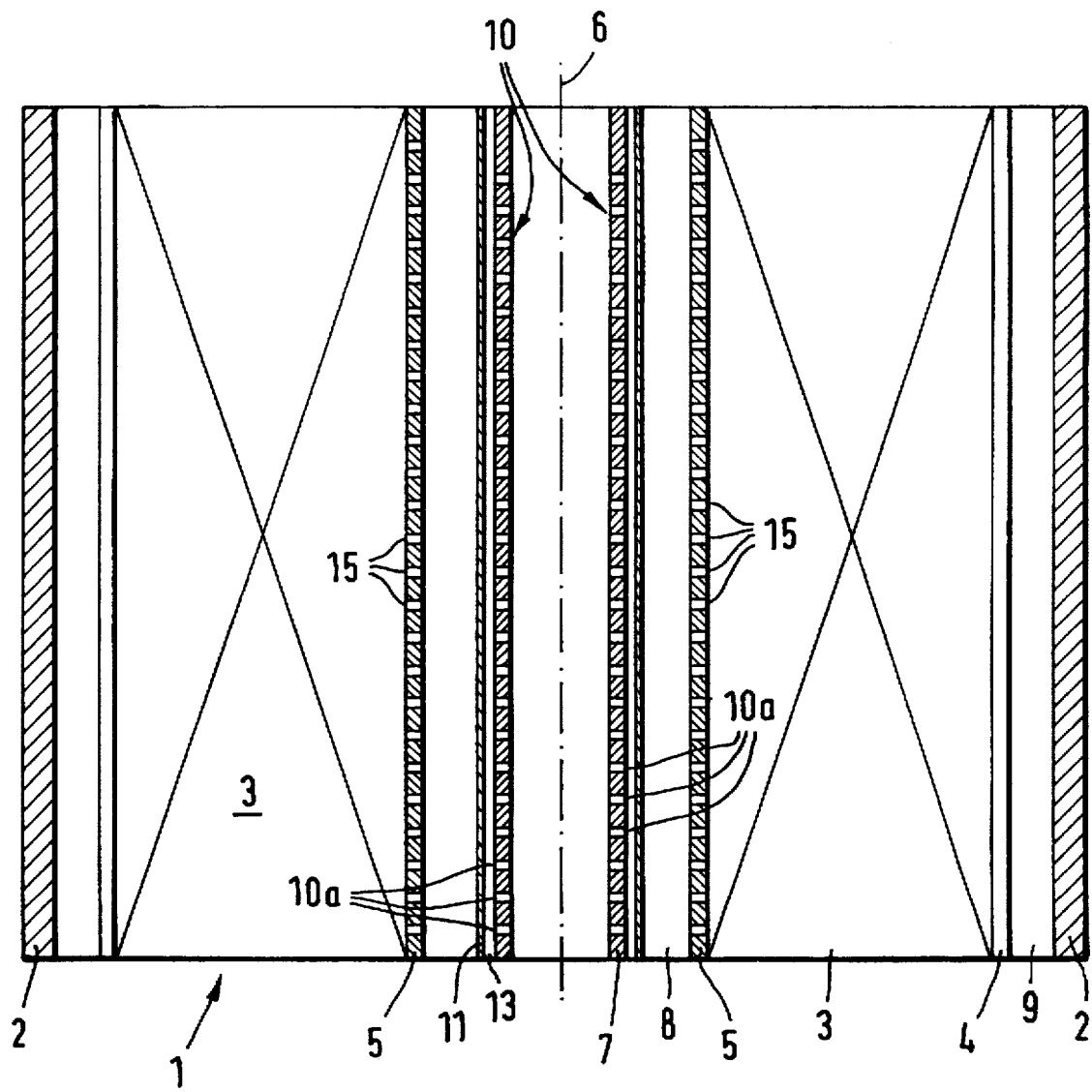
FIG. 1 is a simplified representation of a vertical section of a device according to the invention.

The device shown in the figures, generally designated as 1 and as shown in FIG. 1, basically comprises, from outside to inside, circular vessel (2) that is only intimated in the drawing and, within the vessel, a concentrically arranged bulk-material bed (3) with an outer perforated retaining basket (4) and an inner perforated retaining basket (5), a gas feed tube (7) being arranged concentrically with the centre line (6) in such a way that a cylindrical space (8) is formed between the tube and the inner retaining basket (5). An outer annular space (9) is formed between the outer retaining basket (4) and the inner wall surface of the vessel (2).

As shown in the figures, the central gas feed tube (7), which is vertically arranged in the example described, is provided with two rows (10) of gas discharge openings (10a).

Figure 2:
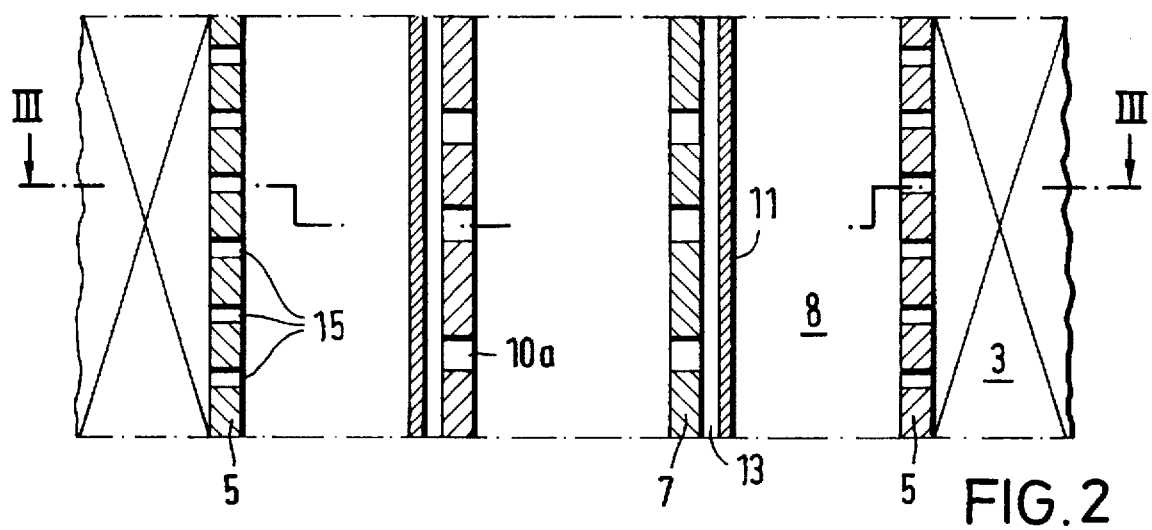
FIG. 2 shows an enlarged vertical section of a partial area of the device according to FIG. 1 along line II—II in FIG. 3.
Figure 3:
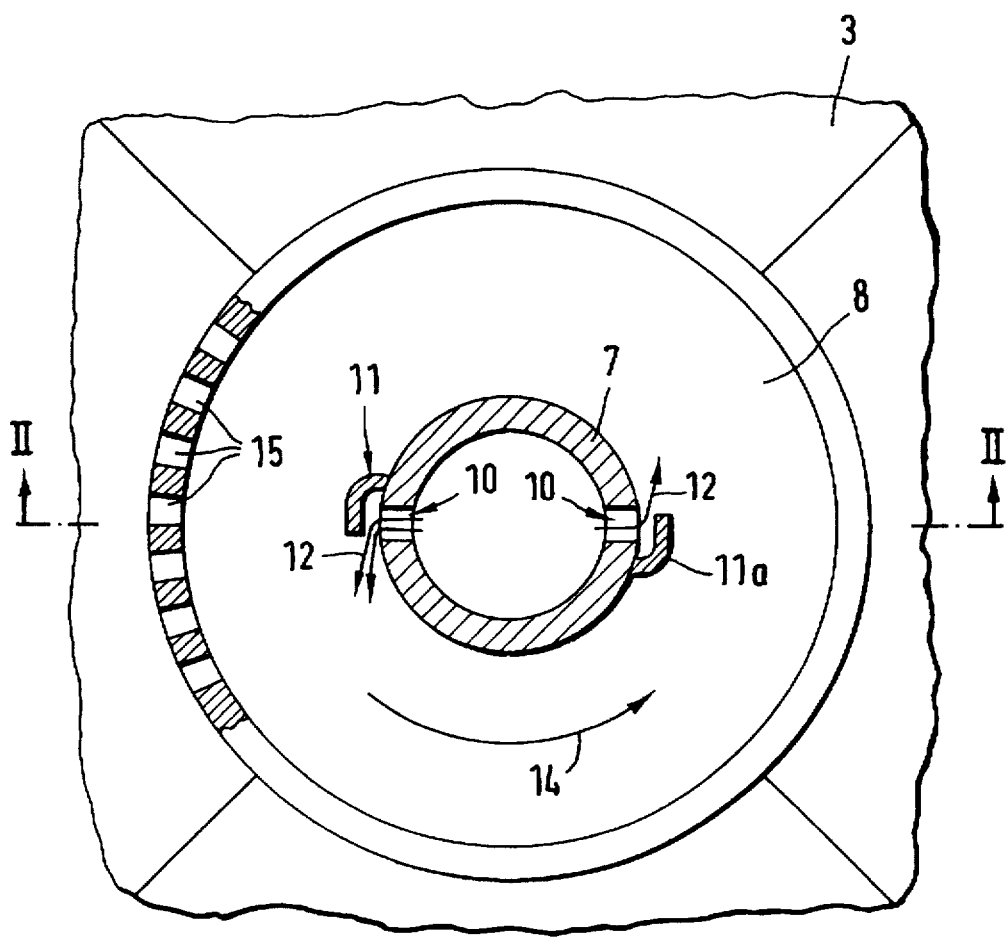
FIG. 3 shows a section approx. along line III—III in FIG. 2.

As shown particularly in FIGS. 2 and 3, the rows of openings (10) in the central gas feed tube (7) are covered by a guiding element (11) which points towards the outside in such a way that, during the discharge of the gas, the flow direction of the gas is tangential in relation to the gas feed tube (7), as indicated by the arrows (12) in FIG. 3.

In order to achieve the tangential flow (12), the guiding elements (11) shown as an example in FIG. 3 are designed as plates (11a) welded to the gas feed tube on one side only, such that a tangential discharge slot, designated as 13 in FIG. 1, is obtained. It is due to this tangential flow that a rotating flow, which is indicated by the arrow (14) in FIG. 3, is achieved in the cylindrical space (8). The inlet openings or perforations of the inner retaining basket (5), which are only intimated in FIGS. 1 to 3, are designated as 15; the openings or perforations in the outer retaining basket (4) are not specifically shown in FIG. 1.

FIG. 4 shows a slightly modified embodiment. In this embodiment, the rows (10) of openings (10a) in the central gas feed tube (7a) are equipped with guide plates (11b) which form the outlet gap (13a), the guide plates (11b) being basically semicircular in order to form a small pressure equalisation chamber (16), in which the pressure of the gas leaving the feed tube can be equalised over the entire length of the gas feed tube (7a), before the gas is discharged tangentially via the slot (13a).

FIGS. 5 and 6 only show an example of a feasible embodiment of an impingement surface of the retaining basket. FIG. 5 shows a plan view of the impingement surface (5), while FIG. 6 shows a side view along line VI—VI in FIG. 5. Here, horizontal deflector elements (17) are arranged between vertical supports (18) in such a way that comparatively large openings (19) are formed for the gas to be circulated. It should be noted that configurations other than those shown in these drawings are possible.

I claim:

1. A device for feeding a gaseous fluid radially from a center of a vessel outwards, the device comprising:

a central vertical gas feed tube having at least one vertical row of discharge openings;

a catalyst bed of bulk material;

perforated basket means for accommodating the catalyst bed, the perforated basket means comprising a perforated cylindrical surface surrounding the central vertical gas feed tube in a space relationship thereto and defining therewith a hollow cylindrical space, the perforated cylindrical surface defining an impingement surface of the catalyst bed; and deflector means provided at the at least one row of the discharge openings to insure a substantially tangential flow of gas into the hollow cylindrical space, wherein the deflector means comprises a plurality of substantially semi-circular elements defining a pressure equalization chamber.

2. A device according to claim 1, wherein the discharge openings extend at an angle of incidence to a respective radius.

3. A device according to claim 1, wherein the gas feed tube is provided with a plurality of rows of discharge openings.

4. A device according to claim 1, wherein the hollow cylindrical space has a volume which permits a multiple of gas quantity entering the hollow cylindrical space per unit of time to circulate per unit of time.

5. A device for feeding a gaseous fluid radially from a center of a vessel outwards, the device comprising:

a central vertical gas feed tube having at least one vertical row of discharge openings;

a catalyst bed of bulk material;

perforated basket means for accommodating the catalyst bed, the perforated basket means comprising a perforated cylindrical surface surrounding the central vertical gas feed tube in a spaced relationship thereto and defining therewith a hollow cylindrical space, the perforated cylindrical surface defining an impingement surface of the catalyst bed; and deflector means provided at the at least one row of the discharge openings to insure a substantially tangential flow of gas into the hollow cylindrical space to provide for circulation of gas prior to its entering the catalyst bed.

6. A device according to claim 5, wherein the discharge openings extend at an angle of incidence to a respective radius.

7. A device according to claim 5, wherein the gas feed tube is provided with a plurality of rows of discharge openings.

8. A device according to claim 5, wherein the hollow cylindrical space has a volume which permits a multiple of the gas quantity entering the cylindrical space per unit of time to circulate per unit of time.

9. A device according to claim 8, wherein the deflector means are so arranged that a tangentially discharge slot opening towards the cylindrical space is formed, and wherein dimensions of the hollow cylindrical space and the slot are determined according to the following formula:

$$\Gamma = \frac{\dot{V}_0}{l} \sqrt{\frac{r_a(r_0 + h_1)}{n \cdot h \cdot [r_a - (r_0 + h_1)]}} \quad [m^2/s]$$

where $V_o$ [m³/s] is the effective volume of the incoming fluid h [m] is the height of the slot h1 [m] is the height of the slot+design dimension, e.g. thickness of the plate covering the slot l [m] is the slot length n [—] is the number of slots $r_a$ [m] is the outer radius of the cylindrical space $r_o$ [m] is the outer radius of the gas feed tube.

* * * * *